United States Patent
Du et al.

(10) Patent No.: US 7,965,651 B2
(45) Date of Patent: Jun. 21, 2011

(54) METHOD AND APPARATUS FOR SETTING ACTIVE PERIOD STARTING POINT FOR USER EQUIPMENT

(75) Inventors: Lei Du, Beijing (CN); Lan Chen, Beijing (CN); Mikio Iwamura, Yokosuka (JP); Umesh Kadaba Anil, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 101 days.

(21) Appl. No.: 12/343,142

(22) Filed: Dec. 23, 2008

(65) Prior Publication Data

US 2009/0175186 A1    Jul. 9, 2009

(30) Foreign Application Priority Data

Jan. 8, 2008   (CN) .......................... 2008 1 0002864

(51) Int. Cl.
*H04L 12/26*   (2006.01)
(52) U.S. Cl. ..... 370/252; 370/311; 370/328; 455/67.11; 455/515; 455/574
(58) Field of Classification Search .................. None
See application file for complete search history.

(56) References Cited

U.S. PATENT DOCUMENTS

| | | | |
|---|---|---|---|
| 2007/0178875 A1* | 8/2007 | Rao et al. ................... | 455/343.1 |
| 2007/0286080 A1* | 12/2007 | Kim et al. ..................... | 370/236 |
| 2008/0101268 A1* | 5/2008 | Sammour et al. ............. | 370/311 |

FOREIGN PATENT DOCUMENTS

| | | |
|---|---|---|
| JP | 2007060637 (A) | 3/2007 |
| WO | WO 2007/111480 A1 | 10/2007 |
| WO | WO 2007/117120 A1 | 10/2007 |

OTHER PUBLICATIONS

3GPPS TS 36.300 V8.3.0 (Dec. 2007) 3rd Generation Partnership Project; Technical Specification Group Radio Access Network; Evolved Universal Terrestrial Radio Access (E-UTRA) and Evolved Universal Terrestrial Radio Access Network (E-ETRAN); Overall Description; Stage 2 (Release 8); 2007, pp. 1-121).

* cited by examiner

*Primary Examiner* — Chi H. Pham
*Assistant Examiner* — Shick Hom
(74) *Attorney, Agent, or Firm* — Blakely, Sokoloff, Taylor & Zafman LLP (57) ABSTRACT

The present invention has disclosed a method for setting an active period starting point for a User Equipment (UE) in a Discontinuous Reception (DRX) mode, comprising steps of: a base station calculating and storing a position of the active period starting point for the UE based on predetermined parameters, so as to transmit data to the UE in a corresponding active period; the UE receiving Radio Resource Control (RRC) configuration information from the base station, and detecting whether the DRX mode is configured in it or not; the UE calculating its active period starting point based on predetermined DRX parameters in the received RRC configuration information; the UE starting DRX based on the calculated active period starting point; and the UE continuously monitoring a channel, but not starting DRX, when detecting that the DRX mode has not been configured in it. The present invention has also disclosed an apparatus for setting an active period starting point for a UE in a DRX mode.

11 Claims, 7 Drawing Sheets

METHOD AND APPARATUS FOR SETTING ACTIVE PERIOD STARTING POINT FOR USER EQUIPMENT

BACKGROUND OF THE INVENTION

1. Field of Invention

The present application relates to a method and an apparatus for setting an active period starting point for a user equipment in a discontinuous reception mode in a mobile communication system, and more specifically, the proposed method and the apparatus may reduce a possibility in which respective active periods of multiple user equipments overlap with one another, so as to improve system capacity and thus achieve efficient utilization of resources.

2. Description of Prior Art

The $3^{rd}$ Generation Partnership Project (3GPP), which is an important organization in the field of mobile communication, greatly promotes the progress of standardization of the $3^{rd}$ Generation (3G) mobile communication technologies, and establishes a series of communication system specifications comprising Wide Code Division Multiple Access (WCDMA), High Speed Downlink Packet Access (HSDPA), and High Speed Uplink Packet Access (HSUPA). To deal with the challenges of wideband accesses and to meet increasing demands on new services, 3GPP has initiated the standardization of 3G Long Term Evolution (LTE) at the end of 2004, in order to further enhance spectrum efficiencies, to improve performances of users at edge of a cell, and to reduce system delays, with a final purpose to provide a higher speed access service for users moving at a high speed.

With the communication technologies developing in a direction of mobility and wideband, the problem of power saving in mobile terminals attracts great attentions. Most standardization organizations take power saving into account when stipulating relevant standards. Especially, access networks for future mobile communication systems will all transmit data based on IP technologies. However, data arriving at users are discontinuous, due to the burst property of IP data packets and the property of transmission channels being shared among the users. Therefore, how to save the power consumption of user equipments (UEs) is becoming more important.

In a mobile communication system, information exchange between a UE and a base station is based on power supplied thereto. However, for a mobile terminal such as mobile phone, notebook computer and personal digital assistant (PDA), which is powered by a battery, the stored power is limited. Therefore, it is a key point in designing the mobile communication system to reduce the power consumption so as to prolong the standby and serving time of the UE.

To reduce the power consumption of UEs, a Discontinuous Reception (DRX) mode is adopted in the standards of 3GPP. Specifically, the DRX mode is a mode where the power consumption of a UE is reduced by making the UE monitor a channel and receive downlink traffics at given periods which are negotiated by the UE with a base station, so as to reduce unnecessary time for monitoring the channel. Such DRX mode is also adopted in LTE. As compared with previous standards of 3GPP, an operation process of a UE in the DRX mode is same, which may be characterized by several specific parameters, though the DRX mode has slightly different states, channels and trigger conditions in which it is applied, and the like.

Figure 1:
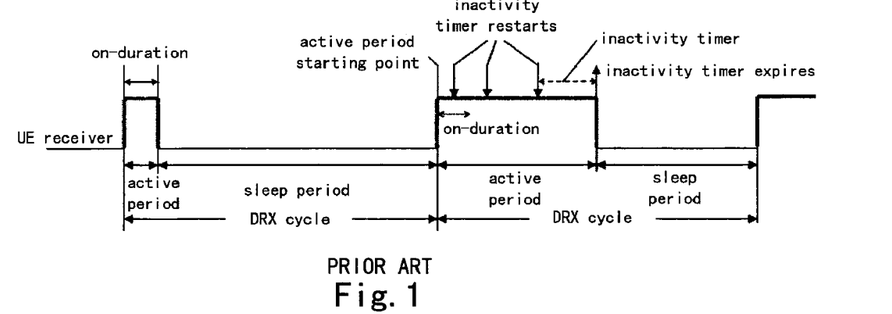
FIG. 1 shows an operation process of a User Equipment (UE) in a Discontinuous Reception (DRX) mode.

The operation process of a UE in the DRX mode is shown in FIG. 1. As shown in FIG. 1, in the DRX mode, the UE is alternatively in an active period and a sleep period. The interval between two successive active period starting points is referred to as a DRX cycle. In the active period, the UE starts its receiver (Rx) to monitor information on a control channel and receive downlink data. However, in the sleep period, the UE does not need to monitor the control channel, and thus the object of saving power is achieved. In the specification 3GPP TS 36.300 where the LTE is described in general, the DRX of a UE in a Radio Resource Control Connected (RRC_CONNECTED) state is explained and defined as follows:

on-duration: the period during which the UE waits for receiving a Physical Downlink Control Channel (PDCCH) after it wakes up from the DRX, with a unit of Transmission Time Interval (TTI). The UE enters the on-duration when it wakes up from the DRX sleep state. If the UE successfully decodes the PDCCH within such period, then the UE will keep a awaking state (Awake) and starts its inactivity timer; otherwise, the UE will enter the DRX sleep state, if possible under the DRX configuration;

inactivity timer: the period during which the UE waits, from a successful decoding of the PDCCH, for a next successful decoding of the PDCCH, with a unit of TTI. If the UE successfully decodes the PDCCH, the UE will keep the waking state (Awake) and restarts the inactivity timer, until a certain Medium Access Control (MAC) header or control element tells the UE to enter the DRX state again and explicitly indicates the DRX cycle in the MAC payload. Or otherwise, the UE automatically enters the DRX state in accordance with a predetermined DRX cycle when the inactivity timer expires; and active time: the period during which the UE is in the waking state (Awake), including the on-period and the period during which the UE performs continuous reception before the inactivity timer expires within a DRX cycle. The minimum of the active time is equal to the on-duration period time, and the maximum thereof is not limited.

By the above described DRX, the UE has not to continuously monitor the channel, but only wakes up intermittently at some certain times, so that the power consumption due to unnecessary monitoring of the channel and decoding of data not pertinent to itself is avoided, resulting in a prolonged standby and serving time of the UE. However, at the same time, the DRX limits the time at which the UE receives the downlink data. For example, in FIG. 1, when the UE is in the sleep period, if data directed to this UE arrives at an eNB (base station), then the eNB must wait for the next active period of the UE to transmit the data to the UE. Thus, this data is delayed. That is to say, the transmission of the downlink data is limited to the active periods of the UE in the DRX state. Each UE has a respective DRX state independently configured by the eNB. When multiple UEs have active periods overlapped, the eNB needs to carry out scheduling and transmitting of data for these multiple UEs within the active periods, while not during other periods. The channels are idle in the periods during which the data cannot be transmitted, resulting in an uneven utilization efficiency of the resources. More severely, the Quality of Service (QoS) may be degraded due to incapability of scheduling a large amount of data within the overlapped active periods.

Figure 2:
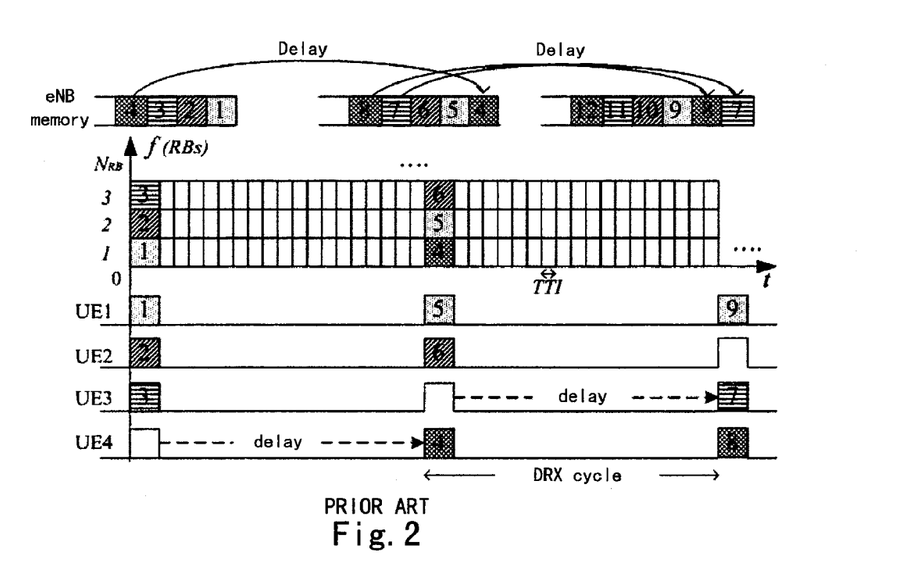
FIG. 2 is a schematic diagram showing the effect of the DRX of multiple UEs on the data transmission.

FIG. 2 is a schematic diagram showing the effect of the DRX of multiple UEs on the data transmission. Here, radio resources are denoted as a set of two-dimensional radio resource blocks, where the horizontal axis represents the time domain with a unit of TTI, and the vertical axis represents the frequency domain with a unit of sub-carrier. Thus, a two-dimensional area consisted of a number of sub-carriers (for example, generally 12 continuous sub-carriers in case of LTE) within one TTI is termed as a Resource Block (RB). The number of RBs within one TTI is denoted by $N_{RB}$. In FIG. 2, an example of DRX where $N_{RB}=3$ is schematically shown. The eNB assigns resources based on such set of radio resources, and transmits the data to the respective UEs on the respective RBs. It may be assumed that there are four UEs-UE1, UE2, UE3 and UE4, which are in DRX state and have same DRX cycles and active periods. In such situation, the four UEs (UE1 to UE4) wake up to monitor the channels and receive the data pertinent to them respectively during the same period. At the time t=0, the eNB detects that these UEs are in the active periods and there are data directed to them in memory. Then, the eNB assigns the resources, so that the first, second and third RBs are respectively used for transmit data packets of number 1, 2, and 3, while the data packet of number 4, directed to UE4, is not transmitted due to insufficient radio resources. Since UE4 does not detect the data pertinent there to within this active period, it enters the sleep period. The eNB must wait until UE4 reenters the active period, and then has a chance to schedule the packet of number 4. Thus, the packet of number 4 is delayed by one DRX cycle. Similarly, the packets of number 7 and 8 are also delayed by one DRX cycle. Such delay may degrade the QoS for delay-sensitive services such as voice. At the same time, in spite of insufficient resources during the active period, the RBs are left unused during the sleep periods of the UEs, resulting in resources wasted and thus system capacity reduced. Therefore, it is necessary to change the state of uneven utilization of resource due to DRX, so as to more efficiently utilize the radio resources while saving the power.

As described above, the DRX of a UE depends on the settings of the following parameters: on-duration, inactivity timer, active time, DRX cycle and active period starting point. Among them, the active period starting point determines the timing at which the UE monitors the channels. The problem of uneven utilization of the radio resources may be effectively solved by setting the active period starting point. In prior art, usually the active period starting point of a UE is determined by a unique identification number for the UE and the length of the DRX cycle. For example, the active period starting point is set to be a value of the unique identification number for the UE modulus the length of the DRX cycle. However, as mentioned in Method and Apparatus for Discontinuously Receiving Packet in a Mobile Communication System Appl (Date: 2007 Apr. 11, SAMSUNG ELECTRONICS CO., LTD, [Reference 1]), when setting the active period starting point in such a manner, the time when the data arrives at the eNB has not been taken into account. Since the data may arrive at the memory of the eNB at any time but transmission of them must be postponed until the next active period of the UE, the time of storing the data is prolonged. Especially, for services such as Voice over IP (VoIP), which are delay-sensitive and generate data at a regular interval, the conventional measures for setting the DRX active period starting point increases the delay of packet transmission, and thus degrades the QoS. Therefore, in Reference 1, it is proposed that the active period starting point is set to be the time instant when the UE starts to receive the first packet from the base station, or the time instant when the UE receives the first downlink control channel from the base station if the base station transmits packets using the control element on the downlink control channel. By adjusting the active period starting point in such a manner, it is possible to reduce the time when the data remains in the memory after arriving at the memory, so as to reduce the transmission delay. In this method, only in the case where the UE continuously monitors the channels and the data is ready to be transmitted as soon as it arrives at the memory, the instant when the UE receives the first data is the instant when the data is generated, and thus the object of reducing transmission delay can be achieved. However, if the UE is in the DRX, the first packet only can be received in the active period. Thus, the storage time cannot be reduced. Further, this method cannot solve the problem of uneven utilization of the radio resources. Moreover, while the Qos is satisfied, it has no great effect on the UE's satisfaction to further reduce the packet delay. For example, when the packet delay of 10 ms is reduced to the delay of 5 ms, it can-not be perceived by the user. However, the problem of uneven utilization of the radio resources will reduce the system capacity and the QoS. It is more important to solve the latter, that is, to more evenly and efficiently utilize the radio resources so as to increase the system capacity while ensuring the QoS.

Therefore, there is a need for a method to effectively solve the problem of uneven utilization of the radio resources due to uneven distribution of the active periods, so as to more efficiently utilize the radio resources while saving the power, and to increase the system capacity while ensuring the QoS.

SUMMARY OF THE INVENTION

An object of the present invention is to provide a method and an apparatus for setting an active period starting point for a User Equipment (UE) in a Discontinuous Reception (DRX) mode, where a possibility in which the active periods for multiple UEs overlap with one another is reduced by randomly setting the active period starting points for the UEs, and in case of taking service types of the UEs into account, the QoS for services with high priority is further guaranteed, resulting in improvement of the system capacity and efficient utilization of the resources.

According to an aspect of the invention, there is provided a method for setting an active period starting point for a User Equipment (UE) in a Discontinuous Reception (DRX) mode, comprising steps of: a base station calculating and storing a position of the active period starting point for the UE based on predetermined parameters, so as to transmit data to the UE in a corresponding active period; the UE receiving Radio Resource Control (RRC) configuration information from the base station, and detecting whether the DRX mode is configured in it or not; the UE calculating its active period starting point based on predetermined DRX parameters in the received RRC configuration information; and the UE starting DRX based on the calculated active period starting point.

According to another aspect of the invention, there is provided an apparatus for setting an active period starting point for a User Equipment (UE) in a Discontinuous Reception (DRX) mode, comprising: at a base station side, a first DRX parameter calculating unit, for determining DRX configuration information for the UE, and calculating a position of the active period starting point based on predetermined parameters included in the DRX configuration information; a DRX state register for storing information corresponding to the respective UE; and a first transmitting/receiving unit for transmitting/receiving information to/from the UE side, and at the UE side, a second DRX parameter calculating unit, for calculating the active period starting point for the UE based on the predetermined parameters included in the DRX configuration information which is received from the base station side; a DRX state adjusting unit, for adjusting the active period starting point for the UE based on the calculated active period starting point for the UE, so that the adjusted active period starting point is consistent with the active period starting point calculated at the base station side; and a second transmitting/receiving unit for transmitting/receiving information to/from the base station side.

According to still another aspect of the invention, there is provided a method for setting an active period starting point for a User Equipment (UE) in a Discontinuous Reception (DRX) mode, comprising steps of: if it is necessary to configure Radio Resource Control (RRC) information for the UE, a base station determining whether it is necessary to configure the DRX mode for the UE, and if it is necessary to configure the DRX mode for the UE, the base station determining predetermined parameters for the DRX of the UE; the base station calculating the active period starting point for the UE based on the predetermined parameters, and adding the calculated active period starting point and predetermined DRX parameters into DRX configuration information, then transmitting it to the UE; and the UE receiving the DRX configuration information transmitted from the base station, and entering the DRX mode based on the active period starting point and the predetermined DRX parameters included in the DRX configuration information.

According to still another aspect of the invention, there is provided an apparatus for setting an active period starting point for a User Equipment (UE) in a Discontinuous Reception (DRX) mode, comprising: at a base station side, a DRX parameter calculating unit, for calculating the active period starting point for the DRX of the UE based on predetermined parameters; a DRX configuration packaging unit, for packaging the calculated active period starting point for the DRX together with predetermined DRX parameters into Radio Resource Control (RRC) information or a Medium Access Control Payload Data Unit (MPDU); a DRX state register for storing information corresponding to the respective UE; and a first transmitting/receiving unit for transmitting/receiving information to/from the UE side, and at the UE side, a DRX state adjusting unit, for adjusting its DRX state based on the DRX configuration information from the base station side, and updating its active period starting point to a new position based on the DRX configuration information; and a second transmitting/receiving unit for transmitting/receiving information to/from the base station side.

According to still another aspect of the invention, there is provided a method for setting an active period starting point for a User Equipment (UE) in a Discontinuous Reception (DRX) mode, comprising steps of: the UE receiving Radio Resource Control (RRC) configuration information from a base station, and detecting whether the DRX mode is configured in it or not; if the DRX mode is configured in the UE, the UE calculating the active period starting point for the UE based on predetermined parameters included in DRX configuration information, and notifying the base station of the calculated new active period starting point and its position; and the UE carrying out DRX based on the calculated active period starting point as well as predetermined DRX parameters included in the DRX configuration information.

According to still another aspect of the invention, there is provided an apparatus for setting an active period starting point for a User Equipment (UE) in a Discontinuous Reception (DRX) mode, comprising: at a base station side, a DRX state register for storing information corresponding to the respective UE; and a first transmitting/receiving unit for transmitting/receiving information to/from the UE side, and at the UE side, a DRX parameter calculating unit, for calculating the active period starting point for the UE based on predetermined parameters included in DRX configuration information which is received from the base station side; a DRX state adjusting unit, for adjusting the active period starting point for the UE based on the calculated active period starting point for the UE; a DRX configuration packaging unit, for putting the information on the calculated active period starting point for the UE into a Medium Access Control Payload Data Unit (MPDU), and transmitting it to the base station through a second transmitting/receiving unit; and the second transmitting/receiving unit for transmitting/receiving information to/from the base station side.

According to the present invention, it is possible to distribute the active periods for the UEs in the time as evenly as possible by setting the active period starting points for the UEs in the DRX state, so as to avoid uneven utilization of the resources due to overlapping of the active periods for multiple UEs, and to eliminate adverse effects of the DRX mode of the UEs on the resource utilization.

Further, the present invention helps improve the system capacity and QoS for the UEs. Especially, taking the service types into account, by setting priorities, it is possible to provide better services for UEs with higher priority.

BRIEF DESCRIPTION OF THE DRAWINGS

The above and other objects, features and advantages of the present invention will become more apparent from the following description of the preferred embodiments of the present invention, taken in conjunction with the drawings, in which.

DETAILED DESCRIPTION OF PREFERRED EMBODIMENTS

The embodiments of the present invention are described in detail hereinafter with reference to the drawings. Details and functions unnecessary for the present invention are omitted in the description, so as not to obscure the understanding of the invention.

Hereinafter, the preferred embodiments of a method and an apparatus for setting an active period starting point for a User Equipment (UE) in a discontinuous reception (DRX) mode according to the present invention are described.

First Embodiment

Figure 3:
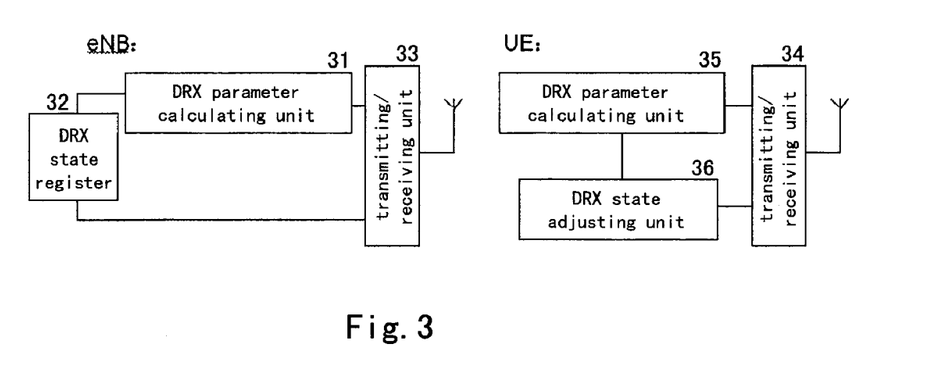
FIG. 3 is a block diagram showing an apparatus for voluntarily setting an active period starting point by a user according to the first embodiment of the present invention.

FIG. 3 is a block diagram showing an apparatus for voluntarily setting an active period starting point by a user according to the first embodiment of the present invention. As shown in FIG. 3, the apparatus for voluntarily setting the active period starting point by the user according to this preferred embodiment comprises a discontinuous reception (DRX) parameter calculating unit 31, a DRX state register 32, and a transmitting/receiving unit 33 at the network side (eNB: source node or base station), as well as a transmitting/receiving unit 34, a DRX parameter calculating unit 35, and a DRX state adjusting unit 36 at the UE side.

At the eNB side, the transmitting/receiving unit 33 (which may be a first transmitting/receiving unit) is adapted to transmit and receive information from a radio interface. The DRX parameter calculating unit 31 (which may be a first DRX parameter calculating unit) is adapted to determine DRX configuration information of the UE. The configuration information may comprise the basic DRX parameters such as DRX cycle, on-duration, and inactivity timer. The DRX parameter calculating unit 31 calculates a position of the active period starting point based on these basic parameters and other information such as the number of UEs, and stores the predetermined DRX parameters in the DRX state register 32 or updates the DRX state register 32 with these DRX parameters.

At the UE side, the DRX parameter calculating unit 35 (which may be a second DRX parameter calculating unit) is adapted to calculate the active period starting point for the UE based on the basic parameters included in the DRX configuration information which is received from the eNB side by the transmitting/receiving unit 34 (which may be a second transmitting/receiving unit), and then send the calculation result to the DRX state adjusting unit 36. The DRX state adjusting unit 36 adjusts the active period starting point for the UE based on the calculation result provided from the DRX parameter calculating unit 35, so that the adjusted active period starting point is consistent with the new active period starting point calculated at the eNB side.

Figure 4:
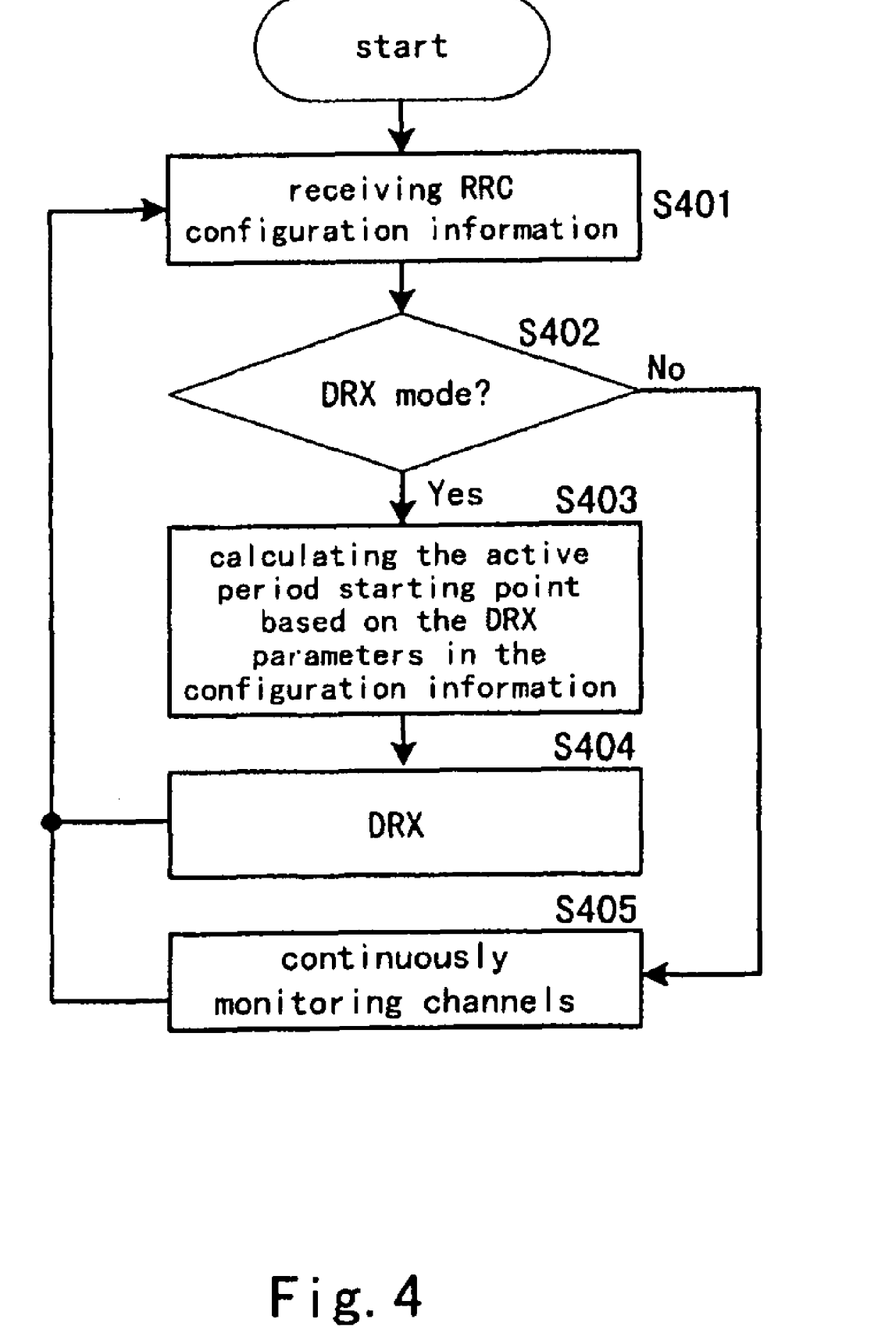
FIG. 4 is a flow chart schematically showing the operation of voluntarily setting the active period starting point in the DRX state by the user according to the first embodiment of the present invention.

FIG. 4 is a flow chart schematically showing the operation of voluntarily setting the active period starting point by the UE according to the first embodiment of the present invention. As shown in FIG. 4, first, at step S401, the UE receives RRC configuration information from the eNB, so as to establish, alter or release an RRC connection. Taking the LTE as an example, the RRC configuration information may be transmitted by means of an RRC Connection Reconfiguration message. The UE detects whether the DRX mode is configured in it after receiving the RRC configuration information at step S402. If the result of step S402 is negative, that is, the DRX mode is not configured in the UE, then the flow turns to step S405, where the UE continuously monitors the channels and will not start the DRX. If the UE again receives RRC configuration information (step S401), then the UE repeats the above operations, and updates its state according to the newly received RRC configuration information.

On the other hand, if the result of step S402 is positive, that is, the DRX mode is configured in the UE, then the flow proceeds to step S403, where the DRX parameter calculating unit 35 calculates the active period starting point based on the relevant parameters in the DRX configuration. Here, the active period starting point for the UE may be calculated according to the following equation (1).

$$APSP = UE \text{ identity mod } (DRX \text{ cycle length div } On\_duration) * On\_duration + n * DRX \text{ cycle length} \quad (1)$$

where "UE identity" indicates a unique identification number for the user, which identification number may be, for example, International Mobile Subscriber Identification Number (IMSI), or, in case of LTE, a Cell Radio Network Temporary Identity (C-RNTI) for uniquely identifying the current UE connection when the UE is in the RRC_CONNECTED state; "mod" indicates an operation of modulus, that is, "a mod b" means a remainder of integer a divided by integer b; "div" indicates an operation of division, that is, "a div b" mean a value of a divided by b, which is down rounded if it is not an exact division; and "n" is a non-negative integer such as 0, 1, 2, . . . , and satisfies the condition that the value of APSP does not exceed the maximum of a cell System Frame Number (SFN).

Next, at step S404, the UE starts the DRX based on the DRX parameters in the received configuration information as well as the active period starting point calculated by itself. After that, the UE repeats the above operations when it again receives RRC configuration information (step S401).

Figure 5:
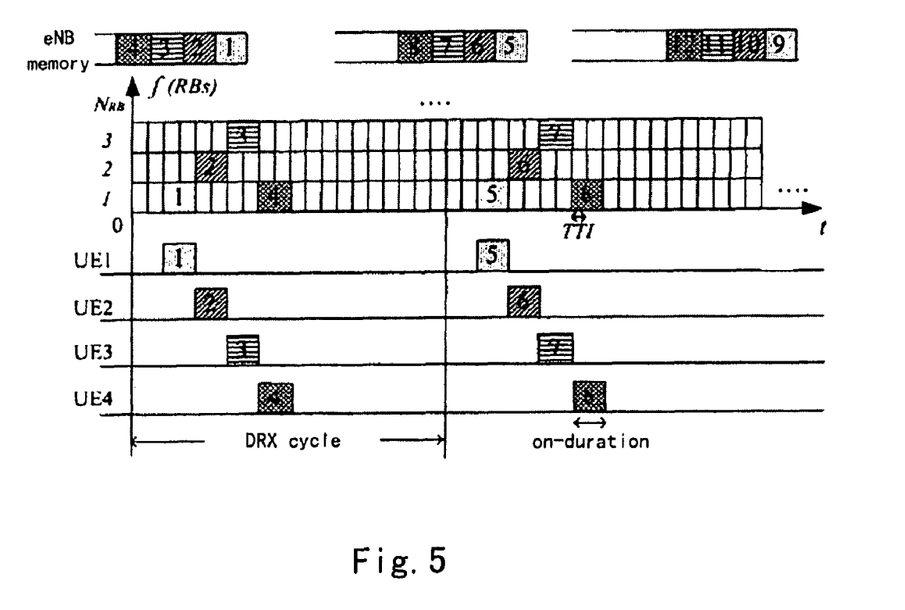
FIG. 5 is a schematic diagram showing the DRX of multiple UEs based on the active period starting points which are calculated in accordance with equation (1)

FIG. 5 is a schematic diagram showing the DRX of multiple UEs based on the active period starting points which are calculated in accordance with equation (1). It may be assumed that the DRX cycle has a length of 20 TTIs, the on-period has a length of 2 TTIs, and the unique identification numbers for four UES, UE1, UE2, UE3, and UE4, are 1, 2, 3, and 4 respectively. Then, according to equation (1), UE1 should wake up to be in its active period at the time when the $2^{nd}$, $22^{nd}$, $42^{nd}$ . . . TTI starts, UE2 should wake up to be in its active period at the time when the $4^{th}$, $24^{th}$, $44^{th}$, TTI starts, and so on. The respective active period starting points for the four UEs are spaced from one another by one on-duration. In contrast to the case shown in FIG. 2 where the resources are insufficient to transmit the data for all UEs in the first two TTIs, the data for the four UEs are scheduled in the different intervals as shown in FIG. 5, so that the resources can be utilized more evenly in the time axis. Further, the data for all the UEs can be transmitted within the current DRX cycle, preventing packets for some UEs, e.g., the packet of number 4 for UE4 as shown in FIG. 2, from being postponed to the next active period.

Second Embodiment

Figure 6:
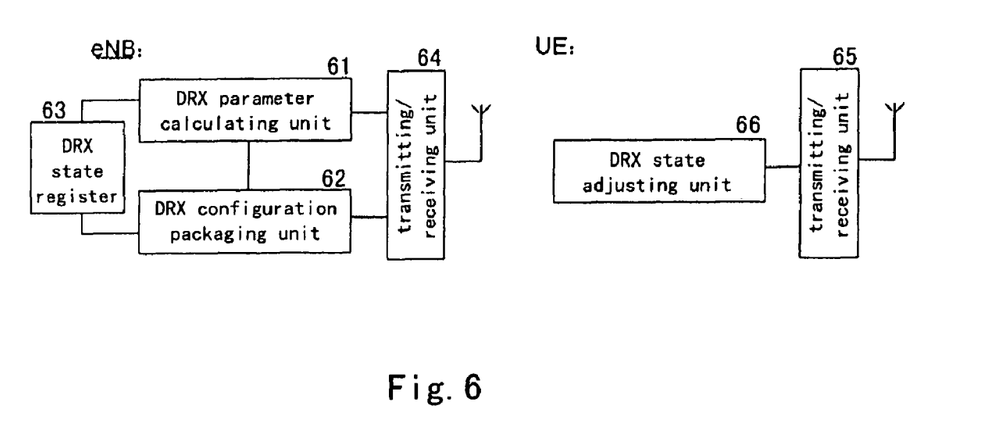
FIG. 6 is a block diagram showing an apparatus for setting an active period point for a UE by an eNB according to the second embodiment of the present invention.

FIG. 6 is a block diagram showing an apparatus for setting an active period point for the UE by the eNB according to the second embodiment of the present invention. As shown in FIG. 6, the apparatus for setting the active period point for the UE by the eNB according to this preferred embodiment comprises a discontinuous reception (DRX) parameter calculating unit 61, a DRX configuration packaging unit 62, a DRX state register 63, and a transmitting/receiving unit 64 at the network side (eNB: source node or base station), as well as a transmitting/receiving unit 65, and a DRX state adjusting unit 66 at the UE side.

At the eNB side, the DRX parameter calculating unit 61 may calculate the active period starting point for the UE in the DRX state with equation (1) as described above, and stores the calculation result in the DRX state register 63 or updates the DRX state register 63 with the calculation result. The DRX configuration packaging unit 62 packages the calculated active period starting point in the DRX state together with other DRX parameters into an RRC message or a Medium Access Control Payload Data Unit (MPDU), and sends it to the UE via the transmitting/receiving unit 64. The DRX state register 63 stores current DRX state information of all UEs connected to this eNB, including position information of the active period starting points. The transmitting/receiving unit 64 transmits and receives the information from a radio interface.

At the UE side, The DRX state adjusting unit 66 adjusts its DRX state based on the DRX configuration information which is received from the eNB side by the transmitting/receiving unit 65. Further, the DRX state adjusting unit 66 also updates its active period starting point to a new position based on the received DRX configuration information.

It to be noted that the DRX parameter calculating unit 61 is not limited to calculate the active period starting point for the UE in the DRX state with above equation (1). It is possible to calculate the active period starting point for the UE in the DRX state by other means. For example, the DRX parameter calculating unit 61 may calculate the active period starting point for the UE in the DRX state according to equations (2)-(4) as follows.

$$APSP = \text{rand}(0, DRX \text{ cycle length}) + n*DRX \text{ cycle length} \quad (2)$$

$$APSP = \text{rand}(0, DRX \text{ cycle length div On\_duration})*On\_duration + n*DRX \text{ cycle length} \quad (3)$$

$$APSP(k) = APSP(k-1) + (DRX \text{ cycle length div } M) + n*DRX \text{ cycle length, where } APSP(0) = 0 \quad (4)$$

where "rand (0, a)" in equations (2) and (3) indicates an integer randomly assumed between 0 and a, 0 and a included. These two methods are independent of the identification number of the UE, and thus is more random. "div" indicates the operation of division, as that in equation (1). In equation (4), "M" indicates the total number of UEs in connected state currently. Here, "M" does not exceed the value of the DRX cycle length. "k" indicates the $k^{th}$ UE, and "APSP(k)" indicates the active period starting point for the $k^{th}$ UE. Here, the number of the UEs is further taken into account, so that the respective active period starting points of the multiple UEs are distributed in one DRX cycle as evenly as possible.

Figure 7:
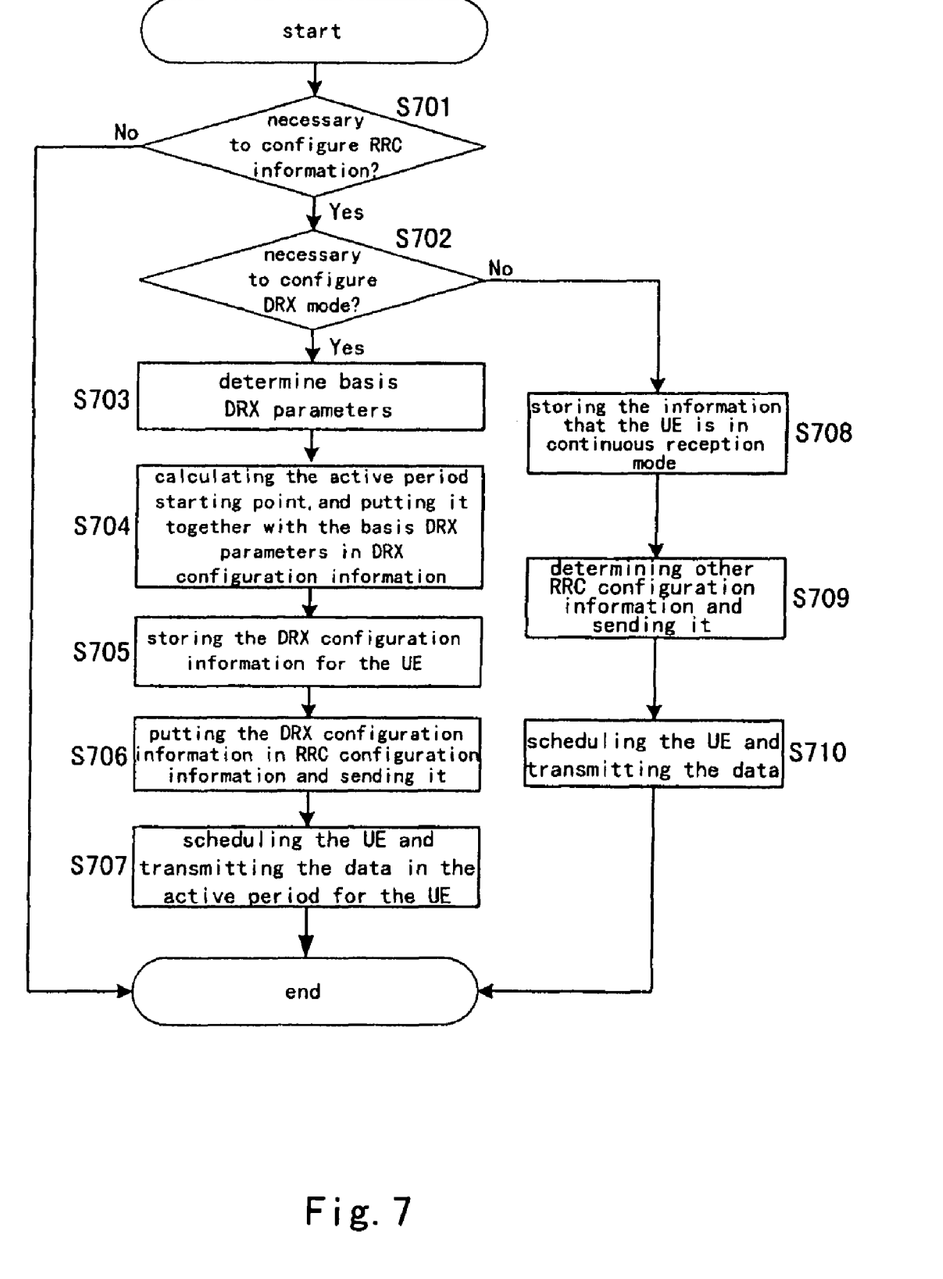
FIG. 7 is a flow chart schematically showing the operation of setting the active period starting point for the UE in the DRX state by means of an RRC message according to the second embodiment of the present invention.

FIG. 7 is a flow chart schematically showing the operation of setting the active period starting point for the UE in the DRX state by means of an RRC message according to the second embodiment of the present invention. As shown in FIG. 7, at step S701, the eNB determines whether it is necessary to configure RRC information to establish, alter or release an RRC connection for the UE based on the current network conditions, UE demands and the like. Taking the LTE as an example, when the UE has to initiate a service, it will send an RRC Connection Request message to the eNB, requesting the eNB to establish a connection. The eNB needs to configure the RRC information after receiving such connection request. If it is determined that there is no need to configure the RRC information at step S701, the flow ends. If it is determined that the RRC information needs to be configured at step S701, the flow proceeds to step S702, where the eNB further determines whether it is necessary to configure the DRX mode for the UE. If it is determined that the DRX mode needs to be configured for the UE at step S702, the flow proceeds to step S703. At step S703, the eNB determines the basic DRX parameters. These parameters comprise, for example, on-duration, inactivity timer, and the like. Next, at step S704, the eNB calculates the active period starting point for the UE according to any one of equations (1) to (4) and following equation (5), and puts this active period starting point together with the basic DRX parameters into the DRX configuration information. At step S705, the eNB stores the DRX configuration information associated with the UE in the DRX state register. After that, the eNB puts the DRX configuration information into the RRC configuration message, and sends it to the UE together with other configuration information (step S706). Here, in case of LTE, usually the RRC configuration message is an RRC Connection Reconfiguration message. The UE sends to the eNB an RRC Connection Reconfiguration Complete message as a replay after successfully receiving the DRX connection reconfiguration message from the eNB, and enters the DRX mode based on the configuration information. At step S707, the eNB can schedule the UE and transmit the data in the active period for this UE. After that, the flow ends.

If it is determined that there is no need to configure the DRX mode at step S702, the flow turns to step S708. At step S708, the eNB records that the UE does not start the DRX and it is in a continuous reception state. In this case, at step S709, the eNB sends the other configuration information to the UE, and can schedule the UE and transmit the data at any time (step S710).

Different from the case shown in FIG. 7 where the DRX parameters are configured by means of the RRC message, the DRX parameters to be altered may be carried in an MPDU, so as to achieve dynamic configuration of DRX. In current discussion on LTE, it is considered that the DRX cycle may be transmitted by the MPDU.

Figure 8:
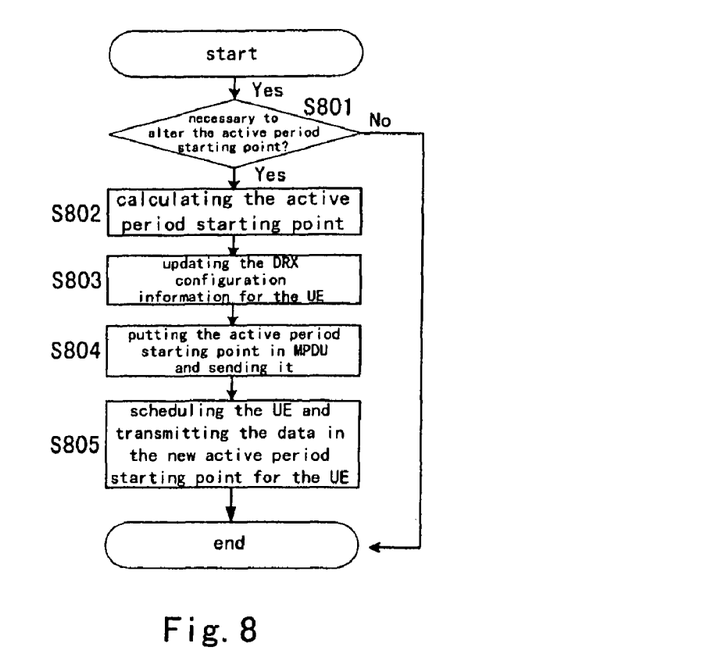
FIG. 8 is a flow chart schematically showing the operation of dynamically changing the active period starting point for the UE by means of a Medium Access Control Payload Data Unit (MPDU) according to the second embodiment of the present invention.

FIG. 8 is a flow chart schematically showing the operation of updating the DRX configuration by means of a new active period starting point carried by the MPDU. As shown in FIG. 8, at step S801, the eNB detects whether it is necessary to alter the active period starting point for the UE. If the active period starting point needs to be calculated for the UE, the flow proceeds to step S802, where a new active period starting point is calculated according to any one of equations (1) to (4) and following equation (5). After that, at step S803, the eNB updates the active period starting point in the stored DRX configuration information for this UE to the calculated new value. Next, at step S804, the eNB puts the new active period starting point into the MPDU and sends it to the user. Then, the UE updates its DRX state based on the new active period starting point. At step S805, the eNB schedules the UE and transmits the data in the new active period. On the other hand, if it is detected that there is no need to alter the active period starting point for the UE at step S801, the flow ends.

In the above steps S704 and S802, the active period starting point for the UE may be calculated according to following equation (5) in addition to equations (1) to (4).

$$APSP(ki) = APSP(ki-1) + (DRX \text{ cycle length div } Mi) + n*DRX \text{ cycle length, where } APSP(0) = 0 \quad (5)$$

where "Mi" indicates the number of UEs which are in the connected state and have a service of $i^{th}$ type, and "i" indicates the $i^{th}$ service type; "ki" indicates the $ki^{th}$ connected UE carrying out the i$^{th}$ type of service. For the i$^{th}$ type of service, for example, if the system categorizes the services into real-time and non-real-time services, it is possible to make i=1 represent the real-time service, and i=2 represent the non-real-time service. In this case, M1 represents the number of the UEs having the real-time services, and M2 represents the number of the UEs having the non-real-time services. Different from equation (4), in equation (5), the current connected UEs are categorized, and the active period starting points for the UEs having the respective types of services are respectively set, so as to have multiple service types in a time interval where the active periods overlap with one another. Thus, it is possible to improve the QoS for the services with high priority by scheduling them preferentially, so as to avoid degrading of the QoS due to overlapping of the active periods of the services with high priority. Especially, for the voice service, the voice service and the data service may be set to have same active period starting point. As compared with the case where multiple voice services are set to have same active period starting point, the former can ensure that the voice service is delivered to the user with a higher priority, and the data service is proponed to the next active period without greatly affecting the QoS.

Further, since the channel for transmitting Multimedia Broadcast Multicast Service (MBMS), the broadcast channel and the channels for transmitting data share the system resources in the LTS systems, the active period starting point calculated in accordance with equations (1) to (5) may overlap with the above non-data channels. Thus, it is necessary for the base station to adjust the active period starting point to another position. The adjustment may be carried out based on the current utilization of the system radio resources.

Figure 9:
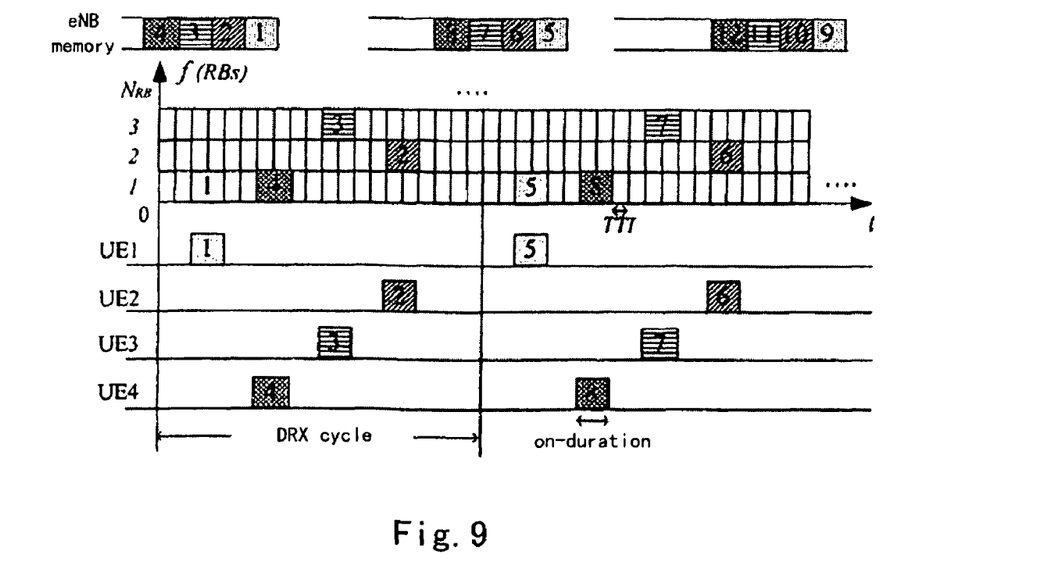
FIG. 9 is a schematic diagram showing the DRX of the UE after the active period starting point for the UE is set in accordance with equation (3) according to the second embodiment of the present invention.
Figure 10:
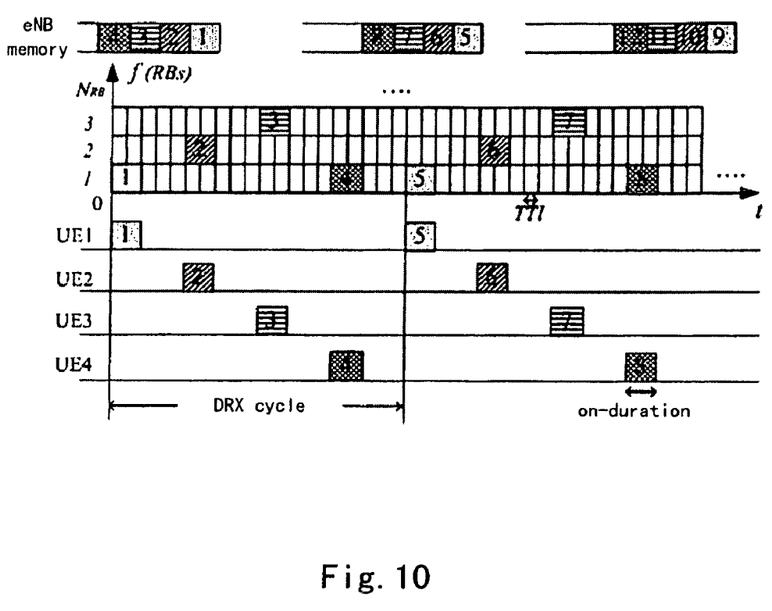
FIG. 10 is a schematic diagram showing the DRX of the UE after the active period starting point for the UE is set in accordance with equation (4) according to the second embodiment of the present invention.

FIG. 9 is a schematic diagram showing the DRX of the UE after the active period starting points are set in accordance with equation (3) in the manner as shown in FIGS. 7 and 8. Different from the case shown in FIG. 4, the active period starting points for the respective UEs as shown in FIG. 9 are randomly selected between 0 and DRX cycle length div On_duration. Thus, the active period starting points are independent of the identification numbers for the UEs, and are more random. FIG. 10 is a schematic diagram showing the DRX of the UE after the active period starting points are set in accordance with equation (4) in the manner as shown in FIGS. 7 and 8. Different from the case shown in FIG. 4, the intervals between the Active period starting points for the respective UEs as shown in FIG. 10 are extended, so that the active periods for the UEs are distributed more sparsely in the time axis. This adapts to the situation where the number of the UEs does not exceed the DRX cycle.

Third Embodiment

Figure 11:
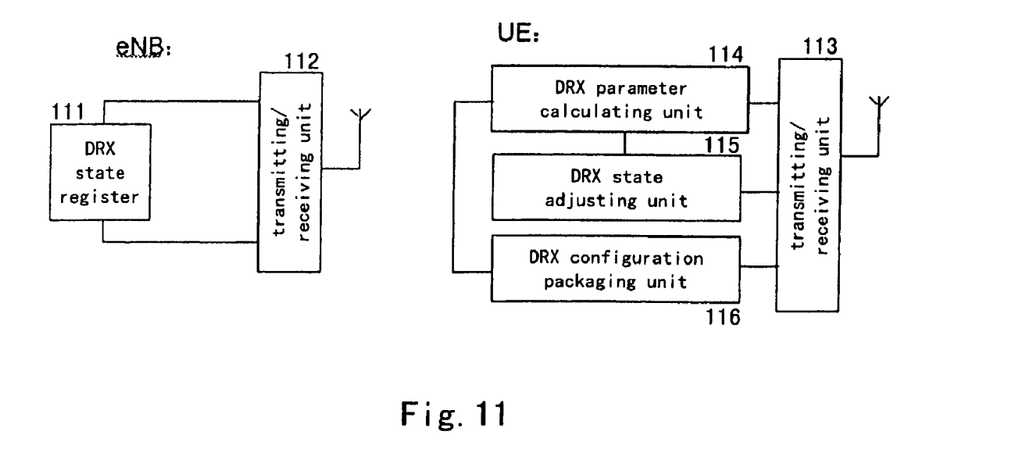
FIG. 11 is a block diagram showing an apparatus for voluntarily setting an active period starting point by a UE and notifying an eNB according to the third embodiment of the present invention.

FIG. 11 is a block diagram showing an apparatus for voluntarily setting an active period starting point by the UE and notifying the eNB according to the third embodiment of the present invention. As shown in FIG. 11, the apparatus for voluntarily setting the active period starting point by the user according to this preferred embodiment comprises a DRX state register 111 and a transmitting/receiving unit 112 at the network side (eNB: source node or base station), as well as a transmitting/receiving unit 113, a DRX parameter calculating unit 114, a DRX state adjusting unit 115, and a DRX configuration packaging unit 116 at the UE side.

In contrast to the above first and second embodiments, the DRX state register 111 and the transmitting/receiving unit 112 are provided at the eNB side. The eNB stores the DRX configuration information received by the transmitting/receiving unit 112, including the active period starting point calculated by the UE, in the DRX state register 111, or updates the information associated with the UE stored in the DRX state register 111 with the received DRX configuration information.

At the UE side, in addition to the units as in the first embodiment, there is further the DRX configuration packaging unit 116. The DRX configuration packaging unit 116 puts the result calculated by the DRX parameter calculating unit 114 in an MPDU, and sends it to the eNB through the transmitting/receiving unit 113. Here, the DRX parameter calculating unit 114 may calculates the active period starting point with any one of equations (1) to (5) as described above. The configurations and operations of other units of the UE in the third embodiment are same as those in the first embodiment, and detailed descriptions thereof are omitted here.

Figure 12:
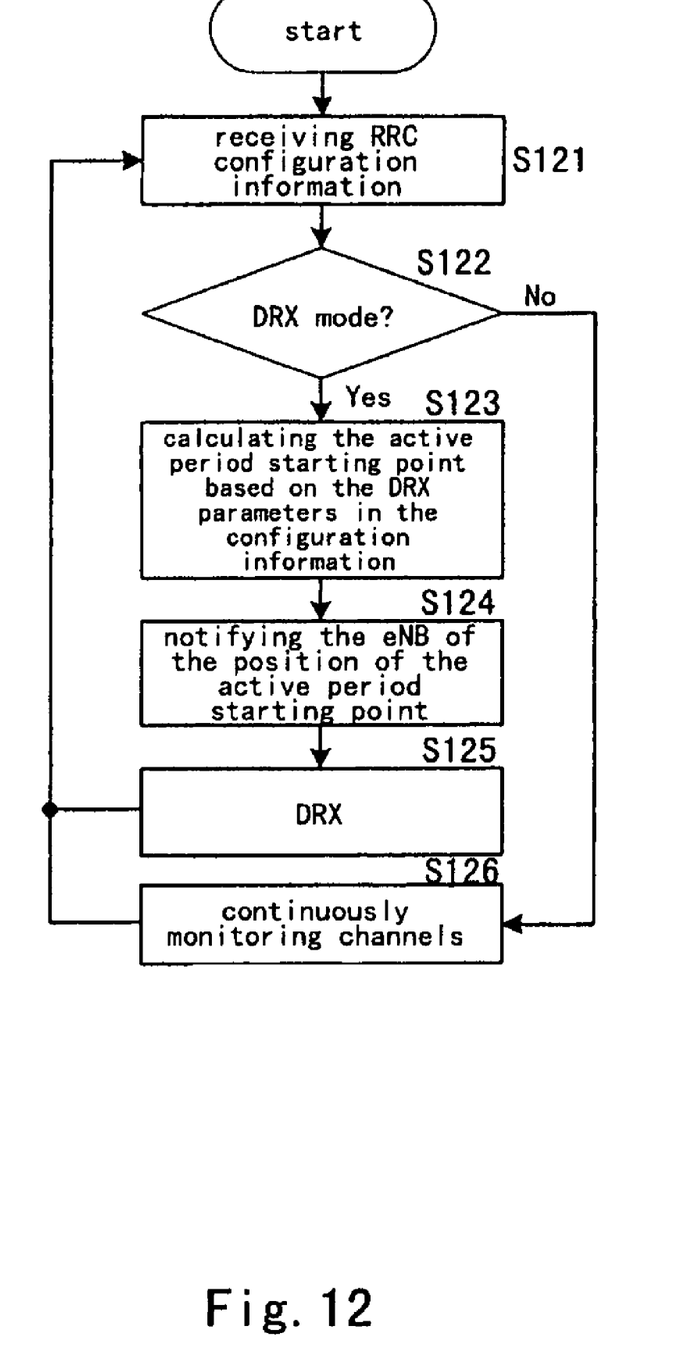
FIG. 12 is a flow chart schematically showing the operation of voluntarily setting the active period starting point by the UE and notifying the eNB according to the third embodiment of the present invention.

FIG. 12 is a flow chart schematically showing the operation of voluntarily setting the active period starting point by the UE and notifying the eNB according to the third embodiment of the present invention. As compared with FIG. 4, the only difference is that the UE sends the calculated new active period starting point to the eNB after calculating the new active period. The eNB updates the information about the DRX state associated with this UE in the DRX state register based on the received new active period starting point. Here, the active period starting point may be transmitted while being carried in the MPDU. In this operation flow, the active period starting point may be calculated according to any one of equations (1) to (5).

Specifically, first, at step S121, the UE receives RRC configuration information from the eNB, so as to establish, alter or release an RRC connection. The RRC configuration information may be transmitted to the UE by means of an RRC Connection Reconfiguration message. The UE detects whether the DRX mode is configured in it after receiving the RRC Connection Reconfiguration message at step S122. If the result of step S122 is negative, that is, the DRX mode is not configured in the UE, then the flow turns to step S126, where the UE continuously monitors the channels and will not start the DRX.

On the other hand, if the result of step S122 is positive, that is, the DRX mode is configured in the UE, then the flow proceeds to step S123, where the DRX parameter calculating unit 114 calculates the active period starting point based on the relevant parameters in the DRX configuration. Here, the active period starting point for the UE may be calculated according to any one of equations (1) to (5) described above. Next, at step S124, the UE notifies the eNB of the calculated new active period starting point and its position. The UE may put the active period starting point into the MPDU for the UE so as to be sent to the eNB. Then, at step S125, the UE carries out the DRX. Further, in steps S126 and S125, the UE repeats the above operations when it again receives RRC configuration information (step S121).

According to the present invention, it is possible to distribute the active periods for the UEs in the time as evenly as possible by setting the active period starting points for the UEs in the DRX state, so as to avoid uneven utilization of the resources due to overlapping of the active periods for multiple UEs, and to eliminate adverse effects of the DRX for the UEs on the resource utilization. Further, the present invention helps improve the system capacity and QoS for the UEs. Especially, taking the service types into account, by setting priorities, it is possible to provide better services for UEs with higher priority.

The present invention is described with reference to the preferred embodiments. It is to be understood by those skilled in the art that various other changes, substitutions and additions are possible without departing from the spirit and scope of the present invention. Therefore, the scope of the present invention is not to be limited to the specific embodiments as described above, and is defined by the appended claims.

What is claimed is:

1. A method for setting an active period starting point for a User Equipment (UE) in a Discontinuous Reception (DRX) mode, comprising steps of:
   a base station calculating and storing a position of the active period starting point for the UE based on predetermined parameters, so as to transmit data to the UE in a corresponding active period;
   the UE receiving Radio Resource Control (RRC) configuration information from the base station, and detecting whether the DRX mode is configured in it or not;
   the UE calculating its active period starting point based on predetermined DRX parameters in the received RRC configuration information;
   the UE starting DRX based on the calculated active period starting point; and
   the UE continuously monitoring a channel, but not starting DRX, when detecting that the DRX mode has not been configured in it.

2. A method for setting an active period starting point for a User Equipment (UE) in a Discontinuous Reception (DRX) mode, comprising steps of:
   a base station calculating and storing a position of the active period starting point for the UE based on predetermined parameters, so as to transmit data to the UE in a corresponding active period;
   the UE receiving Radio Resource Control (RRC) configuration information from the base station, and detecting whether the DRX mode is configured in it or not;
   the UE calculating its active period starting point based on predetermined DRX parameters in the received RRC configuration information;
   the UE starting DRX based on the calculated active period starting point; and
   when RRC configuration information is newly received, the UE updating its state based on the newly received RRC configuration information.

3. The method according to claim 1, further comprising:
   when RRC configuration information is newly received, the UE updating its state based on the newly received RRC configuration information.

4. The method according to claim 1, wherein the base station transmits the RRC configuration information by an RRC Connection Reconfiguration message.

5. An apparatus for setting an active period starting point for a User Equipment (UE) in a Discontinuous Reception (DRX) mode, comprising:
   at a base station side,
      a first DRX parameter calculating unit, for determining DRX configuration information for the UE, and calculating a position of the active period starting point based on predetermined parameters included in the DRX configuration information;
      a DRX state register for storing information corresponding to the respective UE; and
      a first transmitting/receiving unit for transmitting/receiving information to/from the UE side,
   and at the UE side,
      a second DRX parameter calculating unit, for calculating the active period starting point for the UE based on the predetermined parameters included in the DRX configuration information which is received from the base station side;
      a DRX state adjusting unit, for adjusting the active period starting point for the UE based on the calculated active period starting point for the UE, so that the adjusted active period starting point is consistent with the active period starting point calculated at the base station side; and
      a second transmitting/receiving unit for transmitting/receiving information to/from the base station side.

6. A method for setting an active period starting point for a User Equipment (UE) in a Discontinuous Reception (DRX) mode, comprising steps of:
   if it is necessary to configure Radio Resource Control (RRC) information for the UE, a base station determining whether it is necessary to configure the DRX mode for the UE, and if it is necessary to configure the DRX mode for the UE, the base station determining predetermined parameters for the DRX of the UE;
   the base station calculating the active period starting point for the UE based on the predetermined parameters, and adding the calculated active period starting point and predetermined DRX parameters into DRX configuration information, then transmitting it to the UE; and
   the UE receiving the DRX configuration information transmitted from the base station, and entering the DRX mode based on the active period starting point and the predetermined DRX parameters included in the DRX configuration information.

7. The method according to claim 6, further comprising a step of:
   the base station storing the DRX configuration information associated with the UE in a DRX state register.

8. The method according to claim 6, further comprising a step of:
   if it is not necessary to configure the DRX mode for the UE, the base station transmitting other RRC configuration information to the UE, and being able to schedule the UE and transmit the data at any time.

9. The method according to claim 6, wherein the base station transmits the DRX configuration information for the UE to the UE by putting it into an RRC configuration message or a Medium Access Control Payload Data Unit (MPDU).

10. The method according to claim 6, wherein the base station determines the active period starting point based on current utilization conditions of system resources.

11. An apparatus for setting an active period starting point for a User Equipment (UE) in a Discontinuous Reception (DRX) mode, comprising:
    at a base station side,
       a DRX parameter calculating unit, for calculating the active period starting point for the DRX of the UE based on predetermined parameters;
       a DRX configuration packaging unit, for packaging the calculated active period starting point for the DRX together with predetermined DRX parameters into Radio Resource Control (RRC) information or a Medium Access Control Payload Data Unit (MPDU);
       a DRX state register for storing information corresponding to the respective UE; and
       a first transmitting/receiving unit for transmitting/receiving information to/from the UE side,
    and at the UE side,
       a DRX state adjusting unit, for adjusting its DRX state based on the DRX configuration information from the base station side, and updating its active period starting point to a new position based on the DRX configuration information; and a second transmitting/receiving unit for transmitting/receiving information to/from the base station side.

* * * * *